Figure 1:
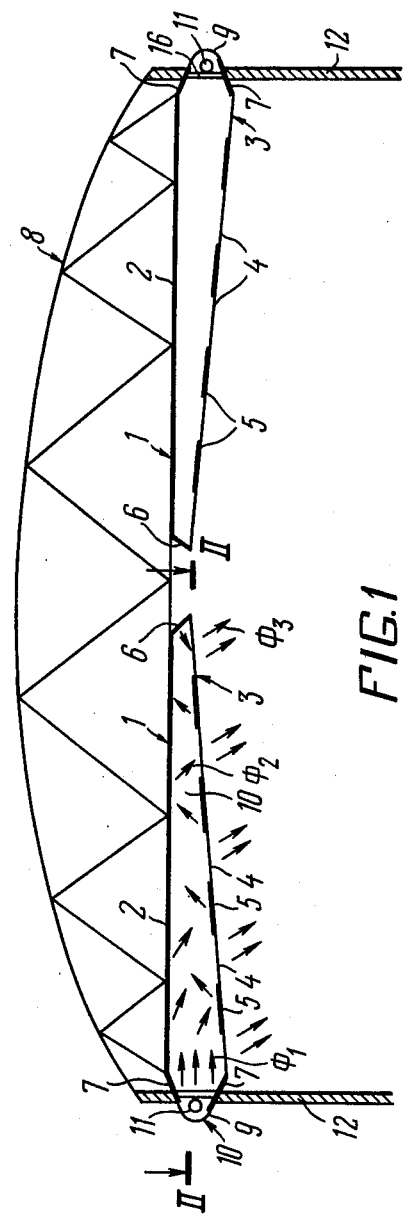

United States Patent [19]

Aizenberg et al.

[11] 4,105,293

[45] Aug. 8, 1978

[54] LIGHTING INSTALLATION BASED ON LIGHT GUIDE

[76] Inventors: Julian Borisovich Aizenberg, ulitsa Koroleva, 3ª, kv. 84, Moscow; Inokh Borukhovich Bukhman, ulitsa Volgogradskaya, 31, kv. 151, Kiev; Vladimir Mikhailovich Pyatigorsky, ulitsa Molodogvardeiskaya, 24, korpus 5, kv. 58, Moscow, all of U.S.S.R.

[21] Appl. No.: 717,554

[22] Filed: Aug. 25, 1976

[51] Int. Cl.² .............................................. F21V 7/00
[52] U.S. Cl. ...................................... 350/264; 362/31
[58] Field of Search ................ 240/1 EL, 1 LP, 9 R, 240/41.1, 41.35 C, 41.35 D, 73 LD, 73 LJ, 73 LK; 362/31, 32, 84; 350/258–265

[56] References Cited

U.S. PATENT DOCUMENTS

| | | | |
|---|---|---|---|
| 3,491,245 | 1/1970 | Hardesty | 240/1 EL X |
| 3,902,056 | 8/1975 | Aizenberg et al. | 240/1 LP |

*Primary Examiner*—R. N. Envall, Jr.
*Attorney, Agent, or Firm*—Lackenbach, Lilling & Siegel

[57] ABSTRACT

A lighting installation based on a light guide, comprising a light guide having two surfaces, one of said surfaces is presented to the space being lighted, and at least one light source positioned in an input device including an optical unit directing the luminous flux of the light source into the light guide. The surfaces of the light guide are arranged at an acute angle to each other, which is determined by the dimensions of the lighted space and rated illumination, and one of said surfaces is made light reflective and the other, facing the lighted space, is provided with alternating light transmitting and reflective zones.

11 Claims, 9 Drawing Figures

LIGHTING INSTALLATION BASED ON LIGHT GUIDE

This invention relates to lighting engineering and, in particular, to lighting installations based on light guides.

This invention can be employed in industrial premises devoid of the natural illumination with fire and explosion hazardous mediums, particularly when high levels of illumination are required.

Besides, the proposed lighting installation can be used for the lighting of public buildings: such as design bureaus, places of entertainment, stores, etc, as well as agricultural premises, hothouses and various enclosures, such as climatic chambers and cabinets. It is also possible to use the invention for local illumination in other facilities, such as those involving electronics, precision instrument making, machine building.

There are known lighting installations based on hollow cylindrical slit-type light guides, wherein the luminous energy from light sources of sufficient power is concentrated by optical input devices and directed through a scuttle into a light guide, where it is repeatedly reflected from its internal surface, a part of which is coated by a reflective layer, and exits out to the lighted space through a light-transparent slit made in the lower part along the light guide.

However, such systems featuring cylindrical slit-type light guides do not permit employment of extended light sources of great power (xenon self-cooling lamps with a power of 10 or 20 kw and more, fluorescent lamps, particularly highintensity halogen incandescent lamps and other light sources where the luminous element length exceeds 250-300 mm) because their luminous flux is difficult to redistribute in space.

There is also known a device based on a plane-parallel light guide, one of its surface being light reflective and the other being light transmissive.

This device cannot ensure uniform distribution of luminance of the light transmitting surface at a relatively great distance from the light source, which is a vital task of light guides employment for general lighting of rooms or other areas and/or volumes. Expensive materials possessing high transmission coefficients and interference properties required for such devices, reduce considerably their practical application.

It is therefor an object of the invention to provide uniform distribution of luminance of large light-diffusing surfaces at a low height of a lighting installation and employment of extended linear light sources.

This is achieved in a lighting installation based on a light guide comprising a light guide having two surfaces, one of said surfaces being presented to the lighted space, and at least one light source positioned in an input device including an optical unit and directing the luminous flux of the light source into the light guide and, according to the invention, the surfaces of the light guide are arranged at an acute angle to each other, which is determined by the dimensions of the lighted space and the rated illumination, one of the surfaces being light reflective and the other facing the lighted space being provided with alternating light reflective and light transmitting zones.

It is advisable for cylindrical lighted spaces that one of the surfaces of the light guide be made as a cone.

It is advisable that the light guide be provided on the side facing the light source with initial portions connected to the optical unit of the input device.

It is also advisable that one surface of the light guide, which reflects the luminous flux, and the light reflective zones of the other surface be made of metallized polyethylene/terephtalate film, whereas the transmitting zones of the other surface of the light guide be made of non-metallized polyethylene/terephthalate film.

Employment of such lighting installation based on a light guide and equipped with powerful light sources permits:

considerable reduction of the number of light sources in buildings due to employment of fewer powerful lamps, possessing in some cases higher luminous efficiency;

effective employment of modern powerful extended linear light sources;

simplified mounting procedure;

providing architectural lighting of building interiors by applying artistic patterns on the bottom surface of the light guide and changing the interior by replacing the bottom surface of the light guide and using a new one with a different pattern;

considerable reduction of heat liberation by light sources into the lighted room or space, easy centralized heat removal from consecutively connected cylindrical hollows of input units and lengthwise (in relation to lamps and reflectors) blowing of installations;

sharp reduction in height of lighting equipment as compared to existing installations so that it takes up minimum height in the lighted room or space; and significant reduction of material expenditures on construction and operation of lighting equipment.

Figure 2:
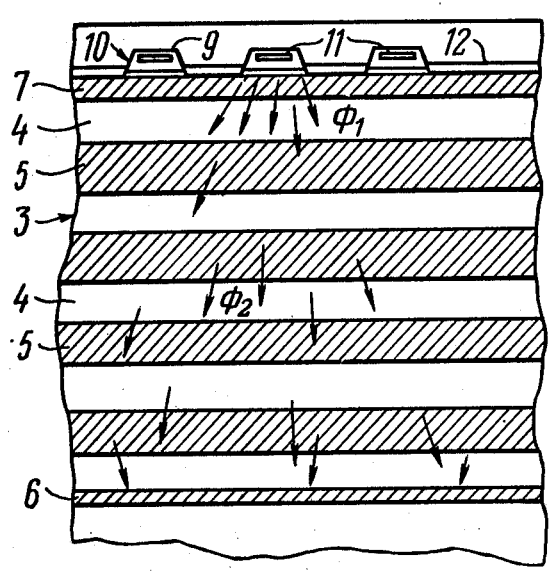
Figure 3:
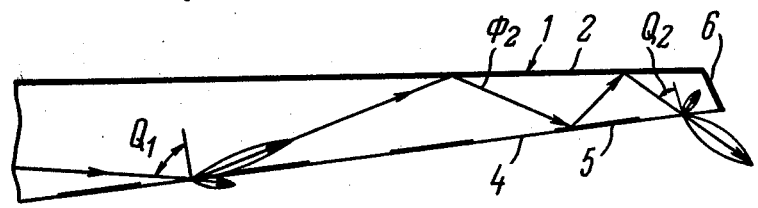
Figure 4:
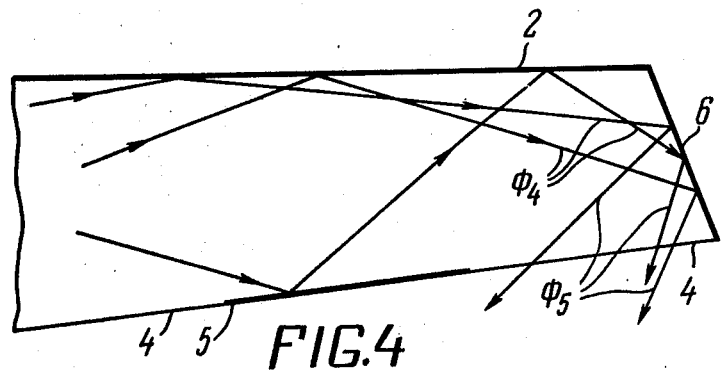
Figure 7:
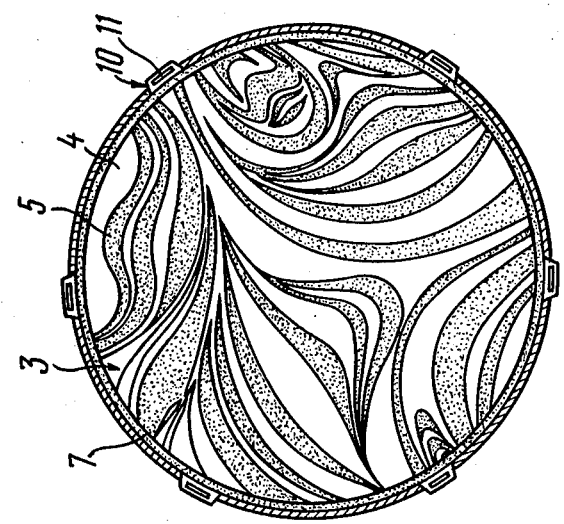
Figure 5:
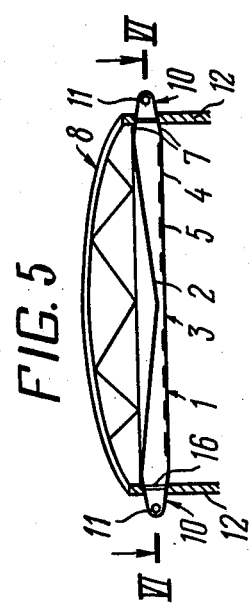
Figure 6:
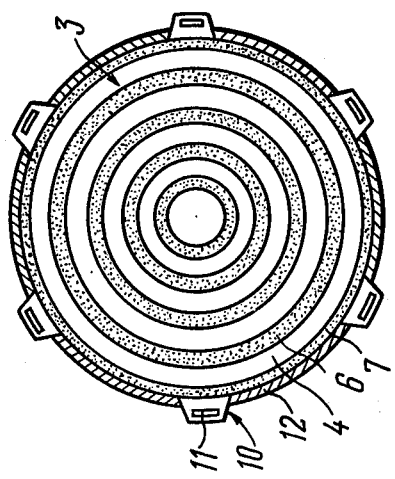
Figure 8:
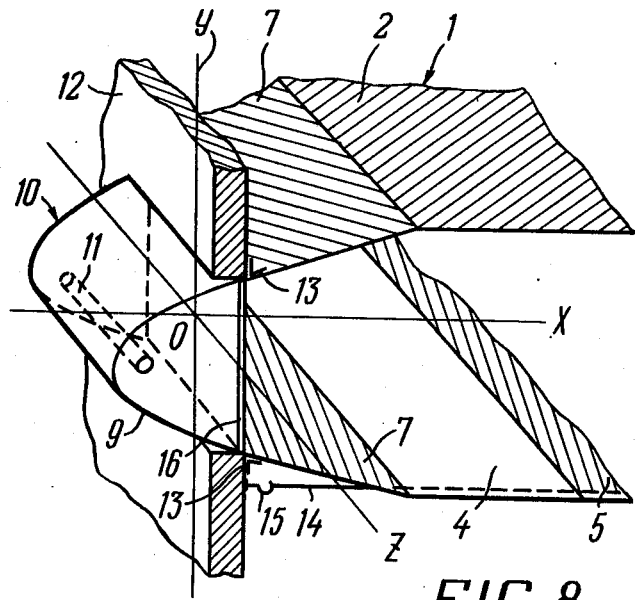
Figure 9:
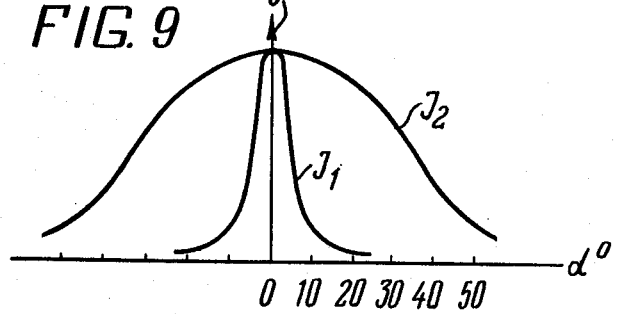

Other objects and advantages of the invention will become apparent from the following detailed description and accompanying drawings, wherein:

FIG. 1 shows a sectional view of a lighting installation based on a light guide, according to the invention;

FIG. 2 shows a sectional view taken along the line II—II of FIG. 1 of the same lighting installation with a bottom of the light guide FIG. 3 shows distribution of the luminous flux in the light guide FIG. 4 shows reflection of the luminous flux by the butt element of the light guide, FIG. 5 shows a sectional view of a lighting installation based on a light guide suitable for cylindrical spaces, FIG. 6 shows a sectional view taken along the line VI—VI of FIG. 5 of the same lighting installation with a bottom surface of the light guide, FIG. 7 shows another embodiment of a bottom surface of the light guide, FIG. 8 shows an input device of the light guide and FIG. 9 are charts of dependence of the luminous intensity of the input device on the radiation angle in the longitudinal and cross planes, A lighting installation based on a light guide comprises a light guide 1 (FIG. 1) composed of an upper surface 2, a lower surface 3, which is provided with alternating transmitting zones 4 and reflecting zones 5, a butt element 6 and initial portions 7.

The light guide 1 is secured to a ceiling 8 of a room being lighted. The initial portions 7 of the light guide 1 are attached to optical units 9 of input devices 10, wherein light sources 11 are placed. The input devices 10 are placed on a protective framework 12 of the lighted room. The luminous flux supplied into the internal space of the light guide 1 from the input device 10 is designated as $\phi_1$. The inter-reflected luminous flux inside the light guide 1 is designated as $\phi_2$. The luminous flux delivered from the light guide 1 to the lighted room is designated as $\phi_3$.

The lower surface 3 (FIG. 2) of the light guide 1 has transmitting zones 4 and reflective zones 5 made as alternating stripes.

FIG. 3 shows changes of the incidence angle Q in the light guide 1 after each reflection.

Referring to FIG. 4, the luminous flux reaching the butt element 6 is designated as $\phi_4$ and the luminous flux reflected from the butt element 6 and delivered to the lighted room is designated as $\phi_5$.

The light guide 1 (FIG. 5) is provided with the upper surface 2 made as a cone.

The lower surface 3 (FIG. 6) is provided with the transmitting zones 4 and reflective zones 5 made as alternating concentric flat circles.

The lower surface 3 (FIG. 7) is provided with the transmitting zones 4 and reflective zones 5 made as a decorative pattern.

The input device 10 (FIG. 8) is mounted on the protective framework 12. The input device 10 comprises the parabolic optical unit 9 and the light source 11.

The initial portions 7 of the light guide 1 are extensions of the optical unit 9 of the input device 10. The initial portions 7 are attached to the framework 12 by angular members 13. To prevent the lower surface 3 from sagging steel or polymer strips 14 are stretched thereunder and secured to turnbuckles 15. The turnbuckles 15 are attached to the protective framework 12. The input device 10 is provided with a scuttle 16 isolating the light source 11 from the internal space of the light guide 1.

The lighting installation operates as follows.

The luminous flux $\phi_1$ from the light sources 11 (FIGS. 1, 2) is directed by the optical unit 9 of the input device 10 through the scuttle 16 into the internal space of the light guide 1 between the upper surface 2 and the lower surface 3. It is inter-reflected in the light guide 1 (the luminous flux $\phi_2$) and leaves through light transmitting (light-diffusing) zones 4 to the lighted room (the luminous flux $\phi_3$).

The initial portions 7 of the light guide 1 increase the angle of the input device 10 and thus raise the lighting efficiency of the installation.

The upper surface 2 and the lower surface 3 of the light guide 1 (FIG. 3) converge at an acute angle, and this arrangement permits a decrease of incidence angles Q of the beams (the luminous flux $\phi_2$) after each reflection ($Q_2 < Q_1$) and thus the losses for Fresnel reflection of the luminous flux comming to the light transmitting zones 4 are considerably reduced.

The luminous flux $\phi_4$ (FIG. 4) reaching the butt element 6 of the light guide 1 is reflected therefrom and comes out through the light transmitting zones 4 to the room being lighted (the luminous flux $\phi_5$).

The alternating light transmitting zones 4 and reflecting zones 5 of the lower surface 3 of the light guide 1 can be made as rectangular stripes (FIG. 2), concentric flat circles (FIG. 6) for cylindrical spaces, or as an artistic pattern (FIG. 7) applied on the lower flat or three-dimensional surface 3. The butt element is not required for cylindrical spaces.

There are possible embodiments of lighting installations, wherein the lower surface 3 of the light guide 1 is inclined (FIG. 1) or horizontal (FIG. 5).

All optical elements of the light guide 1 participating in inter-reflection of the luminous flux of the light sources 11 (the initial portions 7, the upper surface 2 and the lower surface 3, the butt element 6) can be made of light films, for example, of metallized polyethylene/-terephlalate films reflecting the luminous fluxes $\phi_2$ and $\phi_4$ and non-metallized films, which are 12—50 $\mu$ thick, transmitting and at the same time diffusing the luminous fluxes $\phi_3$ and $\phi_5$. In this case, to secure and stretch the upper light reflective surface 2 of the light guide 1, the ceiling 8 of the lighted room is used (roof trusses, booms, etc), whereas the lower surface 3 is secured to the protective framework 12 (or walls) of the lighted room or space.

The thin steel or polymer strip 14 is stretched by means of turnbuckles 15 at 5—6 meter intervals under the lower surface 3 of the light guide 1 to avoid sagging of the film.

The luminous flux of the light sources 11 has to be redistributed in only one transverse plane XOY (FIG. 8) and this permits employment of powerful lamps of extended linear shape in the lighting installation, for example, high-intensity fluorescent lamps, halogen incandescent lamps, xenon arc lamps, etc.

A parabolic cylindrical mirror reflector is used as the optical unit 9 of the input device 10, which produces a sufficiently acute curve of the light intensity $J_1$ (FIG. 9) and directs the maximum light intensity along the OX axis (FIG. 8) into the internal space of the light guide 1. One profile of the reflector can be used for the majority of said light sources. The gain factor of the optical unit 9 of the input device 10 amounts to 2 to 10 depending on the purpose of the installation.

The light intensity curve $J_2$ (FIG. 9) of the linear light sources 11 in the longitudinal axis XOZ (FIG. 8) remains sufficiently wide and can be insignificantly distorted basically by the fringe effect of the optical unit of the device 10.

The reliability of such lighting installation is greatly increased, particularly in fire and explosion hazardous mediums, because powerful light sources and, consequently, the electrical potential are located outside of the room or space to be lighted.

For a room with a floor space of 18 by 18 m, a height of 6m and rated illumination of 500 lux for a plane 0.8 m above the floor, the light source is a halogen incandescent lamp with a power of 1,0 kw, and the number of light sources is 16 lamps; the luminous flux of one source reaches 25,000 lm, and the surfaces of the light guide being placed at an angle of 3°45′.

The present invention thus ensures a rated level of illumination in large rooms, as well as in fire and explosion hazardous mediums, avoids large investments and complies with architectural requirements.

What is claimed is:

1. A lighting installation based on a light guide, which comprises:
    a light guide having two surfaces;
    a means for securing the light guide in a room to be lighted;
    at least one light source;
    at least one input device inluding an optical unit;
    each of said light sources placed in said input device and directing the luminous flux of said light source into said light guide;
    said first surface of said light guide reflecting said light;
    said second surface of said light guide facing said lighted room and provided with alternating light transmitting and light reflective zones; and said first and second surfaces of said light guide are positioned at an acute angle to each other, the magnitude of said angle being dependent upon the dimensions of said lighted room and the rated illumination.

2. A lighting installation as claimed in claim 1 wherein for cylindrical lighted spaces one of said surfaces of said light guide is made as a cone.

3. A lighting installation as claimed in claim 1, including
initial portions of said light guide positioned on the side of said light sources; and
said initial portions of said light guide are extensions of said optical unit of said input device.

4. A lighting installation as claimed in claim 1, wherein
said first surface of said light guide and said reflective zones of said second surface of said light guide are made of a metallized polyethylene/terephtalate film; and
said transmitting zones of said second surface of said light guide are of a non-metallized polyethylene/terephtalate film.

5. A lighting installation as claimed in claim 2, including
initial portions of said light guide positioned on the side of said light sources; and
said initial portions of said light guide are extensions of said optical unit of said input device.

6. A lighting installation as claimed in claim 2, wherein
said first surface of said light guide and said reflective zones of said second surface of said light guide are made of a metallized polyethylene/terephtalate film; and
said transmitting zones of said second surface of said light guide are made of a non-metallized polyethylene/terephthalate film.

7. A lighting installation as claimed in claim 5, wherein
said first surface of said light guide and said reflective zones of said second surface of said light guide are made of a metallized polyethylene/terephthalate film; and
said transmitting zones of said second surface or said light guide are made of a non-metallized polyethylene/terephthalate film.

8. A lighting installation as claimed in claim 1, wherein said light transmitting and light reflective zones form alternating striped areas.

9. A lighting installation as claimed in claim 8, wherein said alternating striped areas are in the form of parallel stripes.

10. A lighting installation as claimed in claim 8, wherein said alternating striped areas are in the form of alternating concentric stripes.

11. A lighting installation as claimed in claim 1, wherein said light transmitting and light reflective zones form a decorative pattern of substantially alternating striped areas.

* * * * *